United States Patent
Verheecke

[11] Patent Number: 6,134,953
[45] Date of Patent: Oct. 24, 2000

[54] PROCESS AND DEVICE FOR CONTROLLING THE WATER CONTENT IN PRODUCTS STORED IN AN ENCLOSURE

[76] Inventor: Eric Verheecke, 270 rue de Cernay, Rejms, France, 51100

[21] Appl. No.: 09/249,769

[22] Filed: Feb. 16, 1999

[30] Foreign Application Priority Data

Feb. 16, 1998 [FR] France .................................. 98 02037

[51] Int. Cl.⁷ ...................................................... G01N 5/02
[52] U.S. Cl. ................................ 73/73; 361/286; 34/557
[58] Field of Search ...................... 73/73 OR, 335.04; 338/35; 361/178, 286; 422/90; 34/557, 491; 454/182

[56] References Cited

U.S. PATENT DOCUMENTS

| | | |
|---|---|---|
| 4,386,471 | 6/1983 | Bowrey et al. . |
| 4,429,343 | 1/1984 | Freud ..................... 73/335.04 |
| 4,564,882 | 1/1986 | Baxter et al. .................. 73/335.04 |
| 4,583,300 | 4/1986 | Mast . |
| 4,599,809 | 7/1986 | Parkes . |

FOREIGN PATENT DOCUMENTS

| | | |
|---|---|---|
| 0095265 | 11/1983 | European Pat. Off. . |
| 0558862 | 9/1993 | European Pat. Off. . |
| 2605851 | 5/1988 | France . |
| 3502423 | 7/1986 | Germany . |

*Primary Examiner*—Harshad Patel
*Attorney, Agent, or Firm*—Dowell & Dowell, P.C.

[57] ABSTRACT

A process for controlling the water content in products stored in an enclosure wherein the process includes measuring at at least one point within the product a value which represents a partial pressure of water vapor at the point within the product when the product is in a state of equilibrium and comparing the measured value with a range of reference values and thereafter modifying the atmosphere within the enclosure if the measured value falls outside a predetermined range.

10 Claims, 2 Drawing Sheets

PROCESS AND DEVICE FOR CONTROLLING THE WATER CONTENT IN PRODUCTS STORED IN AN ENCLOSURE

BACKGROUND OF THE INVENTION

1. Field of the Invention

The present invention relates to a process for controlling the water content in products stored in an enclosure.

The invention concerns any product whose water content may influence storage thereof, and aims more particularly at organic matters and agricultural products, such as cereals. Enclosure is understood to mean any large-dimension storage space, particularly a silo.

2. Description of the Related Art

The fundamental principle of storage consists in maintaining and/or modifying the parameters which determine good quality or an expected quality of preservation of the products. It is known that, for each product, appropriate ranges or limits of water content and/or temperature exist, in which it is possible to maintain or to obtain characteristics of the product stored. The water content of a product is defined as being the ratio of the quantity of water contained in this product with respect to the total weight of said product. In certain cases, the water content can be expressed in the form of molar title.

In order to be sure that the water contents and the temperatures are included in the range of preservation of the products, it is necessary periodically to know the values thereof. To that end, it is known to immerse temperature-measuring sensors. If the enclosure is ventilated, it is also possible to measure the temperature of the incoming and/or outgoing air.

These means do not make it possible to know with precision the value of the water content in the products in order to control the atmosphere of the enclosure.

A device capable of modifying the temperature and/or the water content in the container is then employed. To illustrate this, the device for modifying the atmosphere may be a ventilator which blows air into this enclosure or sucks air out of said enclosure. Use of this apparatus is circumstantial, essentially as a function of the temperature.

Such a process of controlling does not really enable the desired results to be obtained, with the result that the characteristics of the stored products can be modified, such as by the appearance of bacteria, insects or mould, or an excessive reduction in the water content of the products.

In order to overcome the drawbacks of the prior art set forth hereinabove, the invention proposes a process which enables the water content in products stored in an enclosure to be controlled simply and reliably.

SUMMARY OF THE INVENTION

To that end, the invention relates to such a process, characterized in that it comprises the following steps of:

measuring, at at least any one point within the mass of products, a value representative of the partial pressure of the water vapour at said point, in the state of equilibrium of said products, comparing said measured value with a range of reference values representative of the range of partial pressure of water vapour, and appropriately modifying the atmosphere prevailing in the enclosure, if said measured value lies outside of said range.

The process according to the invention makes it possible to maintain the water content in the products within the good preservation range for the products.

Consequently, this process also enables the conditions of subsequent transport and/or transfer of certain products to be better controlled.

This is particularly applicable when it is desired to avoid or reduce the risk of explosion.

By way of illustration, this is useful when products are stored which are constituted wholly or partly by powder and/or dust and which become dangerous under certain conditions of water content.

A first example of illustration is the storage of explosive powder. It is known that damp powder does not explode. Consequently, under given conditions of temperature, pressure, density and other possible parameters, the explosive capacity of this powder decreases when the water content increases.

A second example is the storage of barley. This cereal is the cause of catastrophes in storage silos or in the transformation plants, particularly in malt-producing plants.

By developing an analogy with the first example, the similarity leads to the same conclusion which, in that case, can be rewarded by saying that the risk of explosion of the barley dust increases when the Activity of water, or Aw, of the barley decreases.

Another significant consequence of the process of the invention is that said process makes it possible to know and/or control the parameters of water content and Activity of water of the products when they are packed or subsequently used.

By way of illustration, by packing in small batches products managed by the process of the invention, one is more sure of the validity of the sell-by dates. Another possible illustration consists in measuring, in accordance with the process of the invention, the Aw of a water-in-oil emulsion in order better to know the Aw of the end products, such as for example a low-fat mayonnaise.

The process of the invention makes it possible to know the evolution of the water content for the whole duration of storage, and therefore to avoid the products being momentarily placed under abnormal conditions of Aw.

By way of example, this aspect is important in the storage of seeds for which a momentary excess of Aw will provoke a beginning of germination and a momentary insufficiency of Aw risks reducing their germinal power.

The process according to the invention therefore improves traceability of the products and better guarantees the final quality.

The temperature prevailing in the enclosure is managed as in the prior art. It is not necessarily constant and does not necessarily tend to become constant. Within the enclosure, the transmission of heat by radiation is minute, insofar as the temperature which prevails therein is too low for this mode of propagation. Moreover, in the state of equilibrium, heat convection within the enclosure is very slight. Finally, the transmission of heat by conduction is not great, being given that the products are generally insulating and, in the case of solid products, the surfaces in contact between said products may be relatively small.

On the other hand, Applicants have observed that, in the state of equilibrium, the vapour pressure prevailing within the mass of products was not only the same at a given instant, at any point of this mass, but that it was furthermore equal, to within the conversion and units, to the relative equilibrium moisture and to the Activity of water of the stored products.

The mass of products may either be essentially constituted by the products themselves, particularly if they are liquid products, or include the products and the interstitial air, if they are solid products.

State of equilibrium of the products is understood to mean a state in which, at a given point of the mass of products, the partial pressure of water vapour is stabilized, like the Activity of water, Aw, of these products.

If the products stored within the enclosure, on the one hand, and the air present therein, on the other hand, are considered, the rules of thermodynamics demonstrate that the products and the air, if there is any, will be led to exchange water mutually until an equilibrium is reached. Once this latter is obtained, the partial pressure of water vapour will therefore be substantially identical at any point within the enclosure, as well as the level of each grain.

Now, the pressure of water vapour varies continuously and increasingly with the water content. Therefore, if the value of the pressure of water vapour or of a parameter directly connected therewith, lies outside the range guaranteeing good preservation of the products, one must act circumstantially so as to dry or moisten overall the internal atmosphere of the enclosure.

The physical magnitudes representative of the partial pressure of water vapour are, apart from the latter, the relative humidity of the air in equilibrium with the product, called Relative Humidity Equilibrium, or R.H.E., as well as the Activity of water, Aw. These latter two magnitudes are linked to the water vapour pressure by a relation which is easy to determine, for given temperature conditions.

According to a first characteristic of the invention, the step of modifying the atmosphere prevailing in the enclosure includes a step of extracting at least a part of the products from the enclosure, a step of treating the products extracted, which takes place outside the enclosure, and a step of reintroducing the treated products into the enclosure. This form of embodiment is applicable for example to the treatment of insects that might appear in the enclosure, these insects being destroyed by a chemical treatment outside the enclosure. The same applies when the moisture of the products is much too high, in which case the at least partly extracted products is dried in a drier then reintroduced into the enclosure.

According to a second characteristic of the invention, the step of modifying the atmosphere prevailing in the enclosure is carried out by maintaining the products inside the enclosure, particularly by ventilating the enclosure.

According to another advantageous characteristic of the invention, two values representative of the partial pressure of water vapour are measured simultaneously at two far apart points of the mass of products, and the values thus obtained are compared. If the values are substantially different from one another, this demonstrates the existence of a source of water vapour inside the enclosure, which is the origin of a thermodynamic unbalance and therefore a permanent water vapour pressure gradient. By way of illustration, this source of water vapour may be due to the presence of insects, or to a beginning of fermentation of part of the stored products, which fermentation may be induced by the presence of a hot spot or of a caking of the products. Rapid detection of such a phenomenon, which may be seriously detrimental to good preservation of the products, is therefore particularly advantageous insofar as those responsible for storage may act virtually instantaneously and before considerable degradation occurs.

According to another characteristic of the invention, several values are measured, staggered in time, at the same point within the mass of products, said values being representative of the partial pressure of water vapour a that point. This makes it possible to ascertain whether the modifications brought to the atmosphere within the enclosure have caused the value representative of the partial pressure of water vapour, to vary to the desired extent.

According to another advantageous characteristic of the invention, the value representative of the partial pressure of water vapour is the Activity of water, Aw. Accompanying FIG. 1 illustrates a sorption curve corresponding to the variation of the Activity of water as a function of the water content in products at a given temperature. In the majority of the products and including the cereals, the slope of this curve, near the values of Activity of water included between 0.4 and 0.65, is from 12 to 20%. Measurement of the Activity of water constitutes a magnifying glass effect on the water content of the products. Consequently, measurement of the Activity of water allows access with great precision to the overall water content of products, ensuring a reliable detection of any variation in the state of equilibrium of the thermodynamic system.

From this sorption curve, the temperature and the range of water contents guaranteeing good preservation of the products, it is possible to determine with precision the range of Activities of water allowing good preservation of these products.

The invention also relates to a device for controlling the water content in products stored in an enclosure, comprising means for modifying the atmosphere prevailing in the enclosure, particularly a ventilator, characterized in that it further comprises means for measuring a value representative of the partial pressure of water vapour, in the state of equilibrium of said products, at at least any one point within the mass of products.

BRIEF DESCRIPTION OF THE DRAWINGS

The invention will be more readily understood on reading the following description with reference to the accompanying drawings given solely by way of example, in which.

DESCRIPTION OF PREFERRED EMBODIMENT

Figure 1:
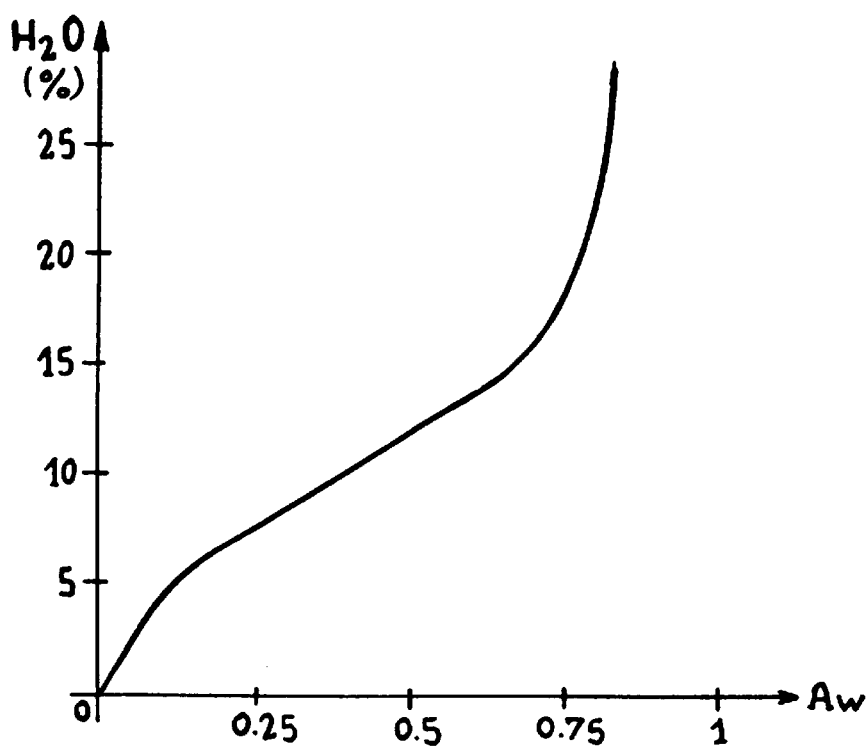
FIG. 1 discloses a sorption curve corresponding to variation of the activity of water (Aw) as a function of water content of product at a given temperature.
Figure 2:
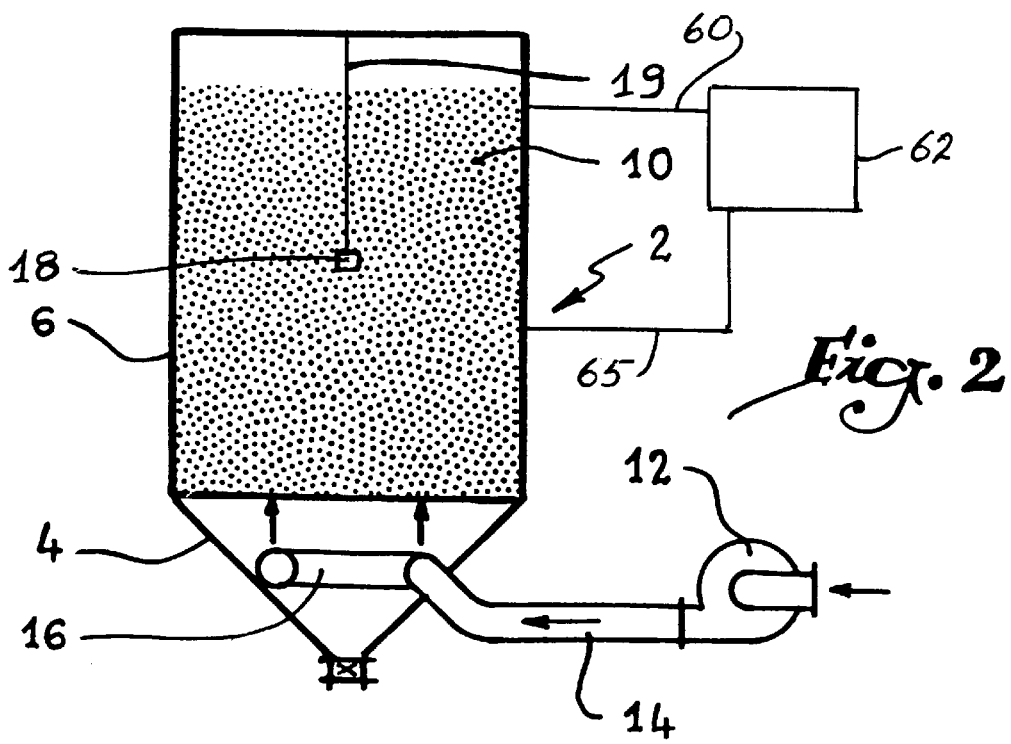
FIG. 2 schematically shows an enclosure in which the process according to the invention may be carried out.

Referring again to the drawings, the enclosure shown in FIG. 2 and generally referred to by reference 2, which is, for example, a silo, comprises an upwardly widening conical base 4 extended by a cylinder 6 closed at its top. A ventilator 12 is provided outside the enclosure 2, in the vicinity thereof. This ventilator supplies air in an intermediate pipe 14 penetrating through the base 4 and in a toric blowing tube 16 inside this base. This toric tube 16 is adapted to direct air towards the products 10.

A sensor 18 is arranged inside the cylinder 6 of the enclosure 2. This sensor is fixed on a metallic plate (not shown), fast with a cable 19 penetrating through the top wall of the cylinder 6. The sensor 18 is therefore immersed in the mass formed by the products 10. Electric wires (not shown), fixed to the cable via a plastic, metal or heat-shrinkable and heat-sealing sheath enabling the stresses exerted on these wires to be limited, ensure electric supply and transmission of the data collected by the sensor. The different elements processing the data furnished by the sensor 18 are not shown in this FIG. 2, but will be explained hereinbelow.

Figure 3A:
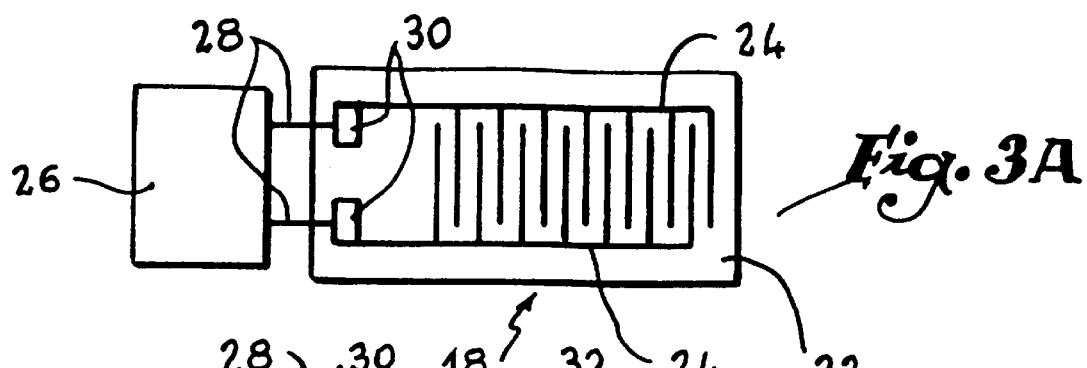
FIGS. 3A and 3B are respectively plan and side views of a sensor for carrying out the process of the invention, as well as of a device ensuring electrical excitation thereof.
Figure 3B:
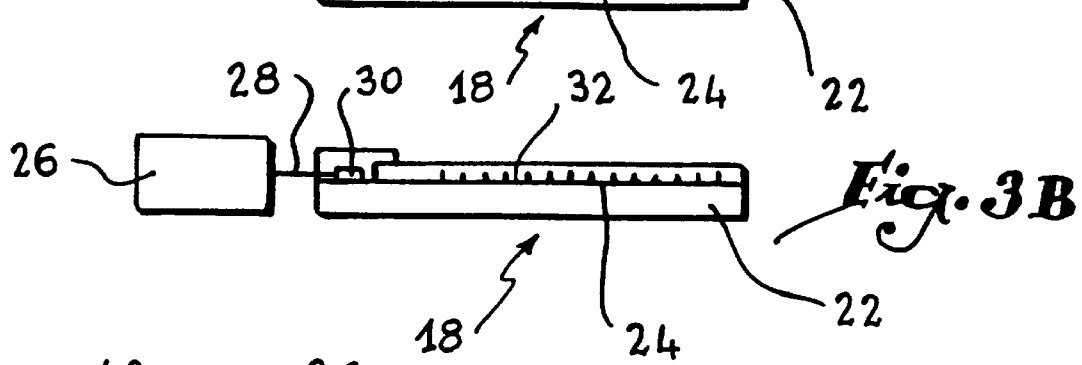
Figure 4:
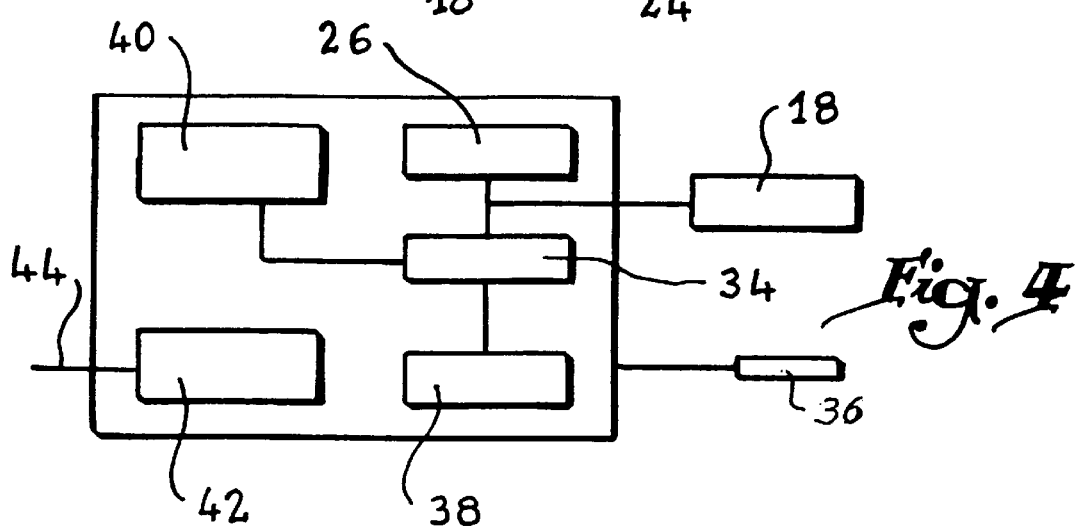
FIG. 4 is a diagram illustrating the result of a measurement effected by the sensor of FIGS. 3A and 3B.

FIGS. 3A and 3B show the sensor 18 in greater detail. It comprises an insulating support 22 on which are placed two electrodes 24 capable of being excited by means of a device 26, which is for example a periodic rectangular signal generator. This device is connected to the electrodes 24 by linking cables 28 and corresponding welding surfaces 30. A thin film 32 covers the electrodes 24, over the major part of the surface of the support 22. This film is for example made of cellulose or with a complex conductive polymer based on polyamides, silicone or polyethylenes, reinforced or not.

This film 32, which is placed in equilibrium with the medium in which it is immersed, presents an impedance varying with the quantity of molecules of water adsorbed at its surface. With a view to measuring this impedance variation, the film 32 is subjected to an alternating electric field by means of the electrodes 24, the voltage of which field may be 1 volt and the frequency 500 Hertz. In the example described, the polymer chosen is such that it is possible to measure the variation of its resistive component, it being understood that the variation of the capacitive component may also be measured by using another polymer.

The impedance is measured by a measuring device 34, which also takes into account the variations of the temperature indicated by a sensor 36 in relation with a corresponding correction element 38. The impedance thus measured at 34 is then delivered to a cell 40 for adjusting the parameters and for calibration in relation with a result delivery unit 42. Calibration is effected by disposing the film 32 in a known atmosphere of which the parameters are imposed. To that end, one of the solutions is to use calibration salts. In the example shown, it has been chosen to deliver a current of 4 milliamperes for zero and 20 milliamperes for 1 in the Activity of water scale. This choice is, of course, not restrictive.

The cell 42 delivers the result of measurement via line 44. This sensor is noteworthy in that it can operate even in the absence of air, with the result that it can also be operational in a liquid. This differentiates it notably from the conventional sensors for measuring the humidity of the air. Moreover, contrary to other curves, the ranges of variation of the Activity of water of the products are known. It is thus possible to take this parameter into account during the calibration procedures.

By way of illustration, for the cereals, the advantageous range of measurements is included between 0.4 and 0.8 concerning the Activity of water. A maximum precision is therefore sought on this range, namely for example an objective of 1% on the range included between 0.55 and 0.65 and 2% for the ranges included respectively between 0.4 and 0.55, and between 0.65 and 0.80. With a view to obtaining the sought-after precisions, each sensor is adjusted to a value close to 0.55 tanks to the use of a saline reference solution. The exact value depends on the nature of the saline reference solution and on its temperature.

Figure 5:
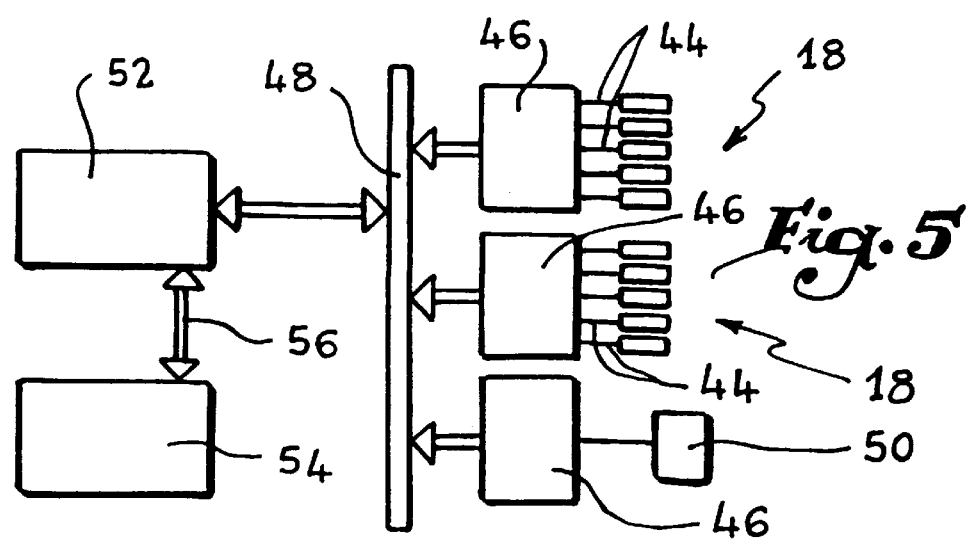
FIG. 5 is a diagram illustrating the display, via a computer, of a measurement obtained by the sensor of FIGS. 3A and 3B.

FIG. 5 shows means for displaying the values measured by means of an assembly of sensors 18. Each of these latter delivers, at the level of line 44, the result of their measurement. These lines are connected to multiplexing boards 46. A control and reading bus 48 receives the information emitted by these multiplexing boards 46, in parallel with the information coming from a reference signal generator 50. This bus delivers information in the direction of an analog-to-digital digitizing board 52, which transmits the information thus processed towards a control and reading computer 54, via a digital communication line 56.

It should be noted that the computer 54 may be in relation with means (not shown) adapted to actuate the ventilation 12 in appropriate manner, depending on whether the value of Activity of water measured by the sensors 18 lies below or above the desired range for good preservation of the products. These may be means adapted to compare the value obtained by the sensors 18 with references defining a range for good preservation of the products, associated with means for measuring the partial pressure of water vapour of the outside air. These comparison means may be combined with means adapted to servo-control the ventilator 12, with the result that the latter blows air into the enclosure 2 or sucks air therefrom, depending on whether the value measured is below or above the desired range.

If the value obtained by the sensors 18 is greater than the maximum limit, the ventilator 12 will be actuated when the partial pressure of water vapour of the outside air is less than the value obtained. In the contrary case, if the value read by the sensors 18 is less than the minimum limit, the ventilator 12 will be actuated when the partial pressure of water vapour of the outside air is greater than the value obtained.

This control may be made by the personnel in charge of the enclosure. This data may also be managed by computer. In that case, when the computer receives results of measurement which allow and/or require control of the ventilator, it actuates an output relay via a digital interface output board. This relay, closed when it is controlling, supplies the electric coil of the power contactor of the ventilator.

An example of implementation of the process according to the invention will now be described hereinafter.

Perishable agricultural produce, in the presence case barley, is stored within the enclosure shown in FIG. 2. The capacity of the cylinder 6 is for example 1000 $m^3$ and the produce once stored occupies a volume of 950 $m^3$, for a mass of 650 tons. The range of Activity of water, for which the preservation of this produce is guaranteed, while not dehydrating it too much, is included between 0.60 and 0.65. The sensor 18 measures the water activity relative to the atmosphere inside the cylinder 6. To that end, the sensor 18 is immersed in the bed formed by the produce, about 10 meters above the bottom. This sensor delivers a measurement of 0.70 for the Activity of water prevailing within the container, which value also corresponds to the Activity of water of the produce stored. Being given that this value is not included in the range allowing good preservation of the products, it is necessary to ventilate the atmosphere inside the cylinder 6 by means of the ventilator 12.

The relative humidity of the outside air is 0.50. This outside air therefore presents a water vapour pressure overall less than that of the interior of the enclosure 2. In addition, if the outside temperature is close to the temperature of the products, suction of the air will therefore allow the atmosphere inside the enclosure 2 to be dried and therefore the Activity of water which is present therein to be reduced and brought in conformity with a good preservation of the produce. To that end, a flowrate of outside air of 500 $m^3$/hour is directed towards the enclosure 2 via tube 16 for 30 minutes.

The thermodynamic state of the atmosphere inside the container is allowed to stabilize. An additional measurement of the Activity of water prevailing within the enclosure 2 is then made, similarly to what has been described hereinabove. This value, which is 0.64, is such as to guarantee good preservation of the products.

With particular reference to FIG. 2, in accordance with another embodiment of invention, the step of modifying the atmosphere within the enclosure 2 may be accomplished by extracting through extraction line 60 at least a portion of the product from within the cylinder 6 and thereafter treating the product in a treatment device 62. As noted, the treatment device 62 is outside of the enclosure 2. The treatment may include, for example, treating for insects within the product such as by destruction with a chemical agent outside the main enclosure, or the treatment area 62 may include a dryer for drying products removed from the main enclosure. After treatment, the treated product is returned through the return line 65 to the cylinder 6 of the enclosure 2. Due to the treatment of the removed product, the product being reintroduced will effect the water vapour characteristics within the main enclosure 2.

What is claimed is:

1. Process for controlling the water content in a product stored in an enclosure, comprising the following steps of:

measuring, at at least one point within the product within the enclosure, a value representative of a partial pressure of water vapor and while the product is in a state of equilibrium, to obtain a measured value comparing the measured value with a range of reference values representative of a range of partial pressures of water vapor, and modifying an atmosphere prevailing in the enclosure, when the measured value lies outside of said range of partial pressure of water vapor.

2. The process of claim 1, wherein the step of modifying the atmosphere prevailing in the enclosure comprises a step of extracting at least a part of the product from the enclosure, a step of treating, outside the enclosure, the product extracted, and a step of reintroducing the treated product into the enclosure.

3. The process of claim 1, wherein the step of modifying the atmosphere prevailing in the enclosure is by ventilation of the enclosure.

4. The process of claim 1, wherein at least two values representative of the partial pressure of water vapor are measured simultaneously at two spaced points in the product and said two measured values are compared.

5. The process of claim 1, including measuring a plurality of values representative of partial pressure, staggered in time, at the at least one point within the product, said plurality of values being representative of a partial pressure of water vapor at the at least one point.

6. Device for controlling the water content in a product stored in an enclosure, comprising;

means for measuring at at least one point within the product a value representative of a partial pressure of water vapor within product in the enclosure when the product is in a state of equilibrium of the product.

7. The device of claim 6, wherein the means for measuring includes at least one sensor measuring an Activity of water within the product.

8. The device of claim 7, wherein said sensor includes a film capable of being activated by an electrical excitation means, and means for measuring an impedance of said film varying with the quantity of molecules of water absorbed by said film.

9. The device of claim 7, including means for comparing a value obtained by said means for measuring with a range of reference values, and means for controlling the means for modifying the atmosphere prevailing in the enclosure.

10. The device of claim 9 wherein said means for modifying includes a ventilator.

* * * * *